April 9, 1929.  L. C. JOSEPHS, JR  1,708,140
HOT WATER HEATER FOR THE INTERIOR OF VEHICLE BODIES
Filed March 25, 1927

INVENTOR
Lyman C. Josephs Jr
BY
Redding, Greeley, O'Shea & Campbell
his ATTORNEYS.

Patented Apr. 9, 1929.

1,708,140

UNITED STATES PATENT OFFICE.

LYMAN C. JOSEPHS, JR., OF ALLENTOWN, PENNSYLVANIA, ASSIGNOR TO INTERNATIONAL MOTOR COMPANY, OF NEW YORK, N. Y., A CORPORATION OF DELAWARE.

HOT-WATER HEATER FOR THE INTERIOR OF VEHICLE BODIES.

Application filed March 25, 1927. Serial No. 178,196.

The problem of supplying satisfactory means to heat the interior of enclosed passenger carrying motor vehicles has long engaged the attention of those engaged in the design and manufacture of such vehicles. The means employed to meet this need have usually taken the form of heaters placed in the floor of the vehicle and deriving their heat either directly or indirectly from the exhaust system of the motor. In some instances heaters deriving their heat from a separate source of energy, such as an electric storage battery or the like, have been employed.

The use of either of these two systems made it necessary to keep the vehicle body closed at all times except when passengers were being taken on or discharged. The interior of the body could not be ventilated because the heating capacity of the heaters employed was not sufficient to warm the incoming draughts of cold air. Thus, the air within the vehicle body quickly became stagnant to the discomfort of passengers. Or, if fresh air were admitted the passengers were rendered uncomfortable because the heaters could not warm the incoming air rapidly enough.

The use of the first class of heaters, i. e. those deriving their heat from the exhaust of the motor, was furthermore unsatisfactory because the amount of heat supplied to the interior of the body varied with the speed of the motor. Thus, when the motor was idle or at rest practically no heat was supplied to the interior of the body. This disadvantage was serious because it was precisely at such times that it was desirable to supply the greatest amounts of heat, since at such times the doors were apt to be opened for the ingress or egress of passengers and large quantities of fresh and cold air were admitted.

The use of the second class of heaters, i. e. those deriving their heat from a separate source of energy, such as an electric storage battery, while it did not entail any variations in the quantity of heat supplied with variations in the speed of the motor, was objectionable because use could not be made of the waste heat of the motor and energy which would have been useful in other ways was used to supply heat.

The present invention was developed to overcome these objections to the use of known types of heaters. Broadly, it contemplates the provision of a combined heater and ventilator so that the air within the interior of the vehicle body may be refreshed while at the same time the fresh air may be heated before being admitted to the interior of the body. The heating of the incoming air is accomplished by utilizing the waste heat of the engine in such a manner that the heat supplied to the heater does not vary too rapidly with variations in the speed of the engine.

Specifically, the means employed comprise a heater made up of a radiating section connected to the water circulating system of the engine. The radiating section is placed in the forward end of the vehicle body and is open to the air at one side and to the interior of the body at the other. Thus fresh air passing through the radiating section is heated by the hot water in the circulating system before being admitted to the interior of the body. The amount of air admitted may be controlled manually by means of louvres or otherwise. The heat supplied to the heater does not vary greatly with engine speed because the temperature of the circulating water tends to remain much more nearly constant than the temperature of the exhaust gases used for the same purposes in the older systems.

A practical embodiment of the invention is illustrated in the accompanying drawings, wherein.

Figure 1:
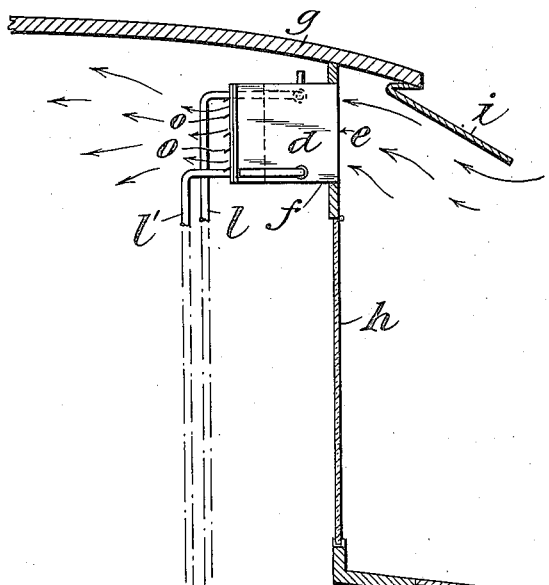
Figure 1 is an elevation partly in section showing somewhat schematically a portion of a vehicle body to which the combined heating and ventilating system according to the invention is applied.
Figure 2:
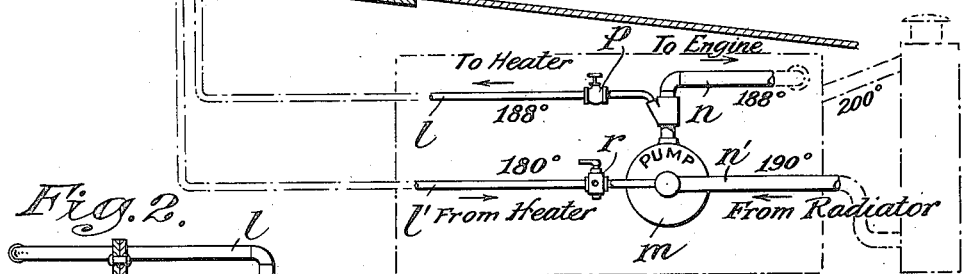
Figure 2 is a plan view of the radiating section, parts being broken away in the interest of clearness.
Figure 2:
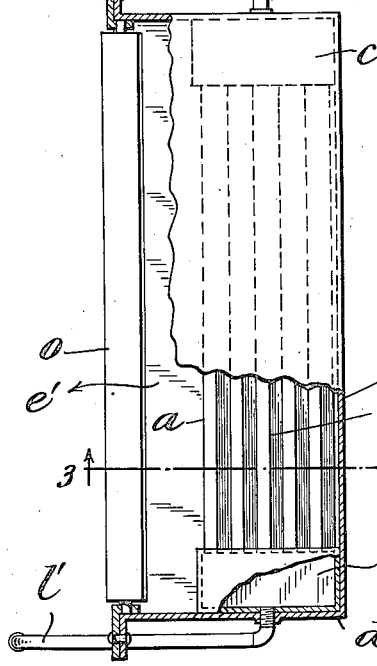
Figure 3:
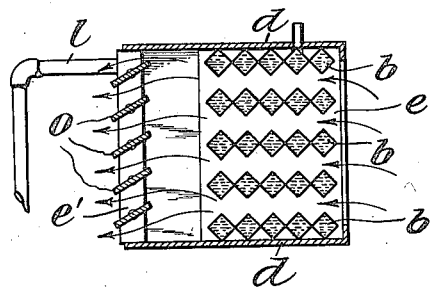
Figure 3 is a vertical section taken in a plane indicated by the line 3—3 in Figure 2 and looking in the direction of the arrows.

The radiating section $a$, comprising an ordinary radiator core made up of honeycombed tubes $b$ communicating with the headers $c, c'$, is enclosed on four sides by the shielding $d$, being open on two sides as at $e, e'$. This unit is adapted to be placed, as at $f$, in the front of a vehicle body beneath the top $g$ and the visor $i$ and above the windshield $h$, the side $e$ being open to the atmosphere and the side $e'$ opening into the interior of the vehicle body.

To the headers $c, c'$, are connected the pipes $l, l'$. The pipe $l$ is connected to the discharge end of a pump $m$, driven by the engine of the vehicle, and the pipe $l'$ is also connected to pump $m$ but at the inlet end thereof. Also connected to the pump $m$ are the pipes $n$, $n'$. The pipe $n$ leading to the water jacket of the engine is connected to the pump $m$ at the discharge end thereof, and the pipe $n'$ is connected to the radiator and to the inlet end of the pump.

The circulating path of the water is as follows: The water flows from the engine, where it has absorbed heat from the cylinders, at a temperature of, say, 200° F. It passes through the radiator where it is cooled to about 190° F. and into the inlet end of the pump. It loses about 2° in temperature in passing through the pump from whence the larger portion is discharged through the pipe $n$ back to the water-jacket of the engine, a smaller portion being discharged into the smaller pipe $l$ at about 188° F. From the pipe $l$ it is lead into the header $c$ and passes through the tubes $b$, giving up a part of its heat to the air passing through the radiating section, and into the header $c'$. From the header $c'$ it is lead through the pipe $l'$ to the inlet of the pump, at about 180° F., where it meets the main body of water coming from the radiator at 190°.

Fresh air is constrained to enter the heater through the opening $e$ by reason of the disposition of the heater beneath the visor $i$ and the forward motion of the vehicle. It passes through the radiating section, absorbing heat from the hot water flowing therethrough, and into the interior of the vehicle body through opening $e'$. The quantity of air entering the vehicle body may be controlled by means of the adjustable louvres $o$ disposed in the opening $e'$. The quantity of water flowing through the heater may be controlled by the valve $p$ in the pipe $l$ and the circulating system of the heater may be drained by means of the drain-cock $r$.

The heater, as shown, is located well above the level of the water in the radiator. Since the water circulates continuously and is subject to atmospheric pressure at the top of the heater, the water will run out of the heater when the engine is at rest and will find its level in the pipes leading to and from the heater equal to the water level in the radiator. Thus the water will be prevented from freezing in the heater when the vehicle is at rest during cold weather. When the engine is started, after having been at rest, the water will again be forced into the heater, driving the air out. The head necessary to accomplish this is produced by the velocity imparted to the water by the pump. The action is the result of connecting the heater pipes on opposite sides of the pump and is particularly desirable in that it makes it unnecessary to provide any vacuum traps or expansion tanks, which would be possible sources of trouble, to maintain the head in the heater.

A further advantageous feature attained by connecting the heater on opposite sides of the pump consists in securing a rapid flow of water through the heating system so that only small pipes are required and it is possible to get the maximum radiating efficiency out of the water.

It will be seen that there has been provided a combined system for heating and ventilating the interior of a closed vehicle body which uses the waste heat of the engine but which does not vary greatly with the speed of the engine, which is simple and efficient, which accomplishes its purpose without the necessity of using otherwise useful energy for heating purposes and which permits of heating the interior of the body while at the same time providing for the necessary ventilation thereof. Various changes may be made in the relative disposition of parts as outlined herein without departing from the spirit and scope of the invention, and no limitations are intended except as defined in the claim.

What I claim is:

In a motor vehicle having an enclosed body and a water circulating system for the motor, said body being provided with an opening through which air may enter the interior thereof, a radiator disposed above the water level of the circulating system for the motor and in the path of air entering the body through said opening, a water impeller having an inlet and an outlet, means connected between said circulating system and the inlet to supply water to the impeller, connections from the outlet both to said circulating system and to said radiator to supply water to each of the latter, valve means to apportion the pumped water between said connections, and means to return water from said radiator to the water impeller.

This specification signed this 18th day of March, A. D. 1927.

LYMAN C. JOSEPHS, Jr.